United States Patent [19]

Perry

[11] 4,142,966

[45] Mar. 6, 1979

[54] MEMBRANE SEPARATION OF WATER FROM AQUEOUS MIXTURES

[75] Inventor: Eli Perry, St. Louis, Mo.

[73] Assignee: Monsanto Company, St. Louis, Mo.

[21] Appl. No.: 456,719

[22] Filed: Apr. 1, 1974

[51] Int. Cl.$^2$ ............................................. B01D 13/00
[52] U.S. Cl. ............................. 210/22 R; 210/321 A
[58] Field of Search ................... 210/23, 321, 500, 22; 55/16, 158; 159/DIG. 27

[56] References Cited

U.S. PATENT DOCUMENTS

| | | | |
|---|---|---|---|
| 2,930,754 | 3/1960 | Stuckey | 210/500 X |
| 2,985,588 | 5/1961 | Binning et al. | 210/500 X |
| 3,088,909 | 5/1963 | Davison et al. | 210/22 |
| 3,216,930 | 11/1965 | Glew | 210/22 |
| 3,228,877 | 1/1966 | Mahon | 210/22 |
| 3,386,912 | 6/1968 | Lazare | 210/22 |

FOREIGN PATENT DOCUMENTS 404601 12/1966 Australia .................................... 210/22

*Primary Examiner*—Frank A. Spear, Jr.
*Attorney, Agent, or Firm*—Thomas B. Leslie

[57] ABSTRACT

Water is separated from aqueous mixtures of organic and inorganic compounds by contacting the aqueous mixture against a first surface of a polymeric membrane selectively permeable to water, contacting the second surface of the membrane with a sweep liquid having a thermally dependent water miscibility, withdrawing a water enriched miscible sweep liquid from the second surface, and forming a water rich phase and a sweep liquid phase through the thermal adjustment of the withdrawn water-enriched miscible sweep liquid. The water miscible sweep liquid is selected from those liquids having normal or inverted thermal miscibility for water and which allow for the thermal separation of a water-rich liquid phase.

1 Claim, No Drawings

MEMBRANE SEPARATION OF WATER FROM AQUEOUS MIXTURES

BACKGROUND OF THE INVENTION

The invention relates to the membrane separation of water from aqueous mixtures of organic and inorganic compounds. In another aspect the invention relates to the membrane separation of water from aqueous mixtures wherein the organic and inorganic compounds are soluble or dispersable in water. Yet in another aspect, the invention relates to the membrane separation of water from aqueous feed mixtures coupled with the use of a water miscible sweep liquid which allows for permeate water separation without change of phase. Still another aspect of the invention relates to the process wherein an aqueous mixture can be more highly concentrated by the removal of at least a portion of the water from the feed mixture.

The separation of water from aqueous mixtures such as dispersions, emulsions, solutions, and the like has been accomplished by various means, for example, distillation, filtration, solvent extraction and combinations of these and other methods. However, these methods often fail to provide satisfactory water separation from aqueous mixtures without the utilization of multiple unit apparatus or the high energy input required by phase change techniques. Known filtration methods also fail to be effective when particle size of the dispersion or emulsion is of such minuteness that the particles pass through the filter material with the water. Solvent extraction methods frequently result in the exchange of one aqueous mixture for another thus presenting the continuing need for water separation from an aqueous mixture or solution. Because of the disadvantages of the existing methods for water separation from aqueous mixtures, a simple, inexpensive process adaptable for all types of aqueous mixtures is highly desirable.

Membrane separation techniques have been utilized to separate mixtures of two or more different molecules, for example, aqueous mixtures, mixed hydrocarbons, azeotropic mixtures, and the like. However, known separation techniques utilized in the separation of aqueous mixtures, frequently are followed by secondary procedures such as distillation. Because of the disadvantages of existing separation methods which principally involve a substantial energy input of a thermal, chemical, or mechanical nature, a simple membrane separation process for separating water from aqueous mixtures involving a minimum energy input is needed.

The growing need for additional sources of water from salt water or from contaminated sources has directed intensive investigations into the separation of water from aqueous mixtures. Substantial improvements have been made in known water separation procedures based on flash evaporation, membrane separation, electrodialytic action, freezing, and the like. However, even with improvements, such known procedures require substantial amounts of power and heat differentials, and frequently require a physical phase change in the system such as vaporization or crystallization. In order to achieve an inexpensive water separation from aqueous mixtures of organic and inorganic compounds, techniques must be developed which require a minimum energy input, avoid phase change, or both.

Accordingly, an object of this invention is to provide improved procedures for separating water from aqueous mixtures wherein power and heat differential requirements are markedly reduced.

Another object of this invention is to provide improved water separation procedures which require relatively simple equipment having low power requirements and minimal thermal values.

SUMMARY OF THE INVENTION

It has been discovered in accordance with the present invention that water is effectively separated from aqueous mixtures through the use of polymeric membranes selectively permeable to water, together with a water miscible sweep liquid having a critical phase separation temperature with respect to water within the thermostability range of the membrane. An essential feature of the water-separation process is that the water miscible liquid have a normal or inverted, thermal-water miscibility curve. The selection of the water-miscible liquid promotes a separation process wherein a minimum energy input is required for the separation of water from the sweep liquid, without the necessity of a change in phase. An additional essential feature of the invention is that the polymeric membrane be selectively permeable to water as compared to other components. The process according to the invention separates water from aqueous mixtures through the steps of: (a) contacting aqueous mixtures with a first surface of a polymeric membrane selectively permeable to water; (b) permeating a portion of the water into and through the membrane; (c) contacting a second surface of the membrane with a water miscible liquid having a thermally dependent water miscibility within the stable temperature range of the membrane; (d) withdrawing a water enriched miscible liquid from the second membrane surface; and (e) forming a water rich phase and a miscible liquid phase through the thermal adjustment of the withdrawn water-enriched miscible liquid.

DETAILED DESCRIPTION OF THE INVENTION

The process of the instant invention comprises the utilization of polymeric membranes which are selectively permeable to water while being substantially impermeable to other components coupled with selected water-miscible sweep liquids having either a normal or inverted, thermal-water-miscibility curve. The process according to the invention also requires that the water in the water-miscible, sweep liquid phase on the second side of the membrane be maintained at a lower chemical potential than the water on the first, or feed side of the membrane. The lower chemical potential results in a force which drives the water permeate through the selective membrane. Multiple stage operations are feasible in scale-up utilizations of the invention since individual stages permit various concentrations and temperatures in order to achieve optimum driving forces.

Continuous processing according to the invention is achievable wherein an aqueous mixture passes on one side of and in contact with the selective membrane and the water-miscible sweep liquid passes on the other side of and in contact with the membrane. The lower chemical potential in the water-miscible sweep liquid, together with a counter current relation of the aqueous mixture feed, provides a driving force for permeating water through the selective membrane to enrich the water-miscible sweep liquid phase. The water enriched, miscible sweep liquid phase is then thermally adjusted as to temperature resulting in a water rich phase and a miscible sweep liquid phase of reduced water content for recycling to repeat the inventive separation system.

For each individual stage the effectiveness of the separation is shown by the separation factor (S.F.). The separation factor (S.F.) is defined as the ratio of the concentration of two substances, A and B, to be separated, divided into the ratio of the concentrations of the corresponding substances in the permeate $$S.F. = \frac{(C_a/C_b) \text{ in permeate}}{(C_a/C_b) \text{ in permeant}}$$

where $C_a$ and $C_b$ are the concentration of the preferentially permeable component and any other component of the mixture of the sum of other components respectively.

The term "chemical potential" is employed herein as described by Olaf A. Hougen and K. M. Watson ("Chemical Process Principles, Part II," John Wiley, New York, 1947.) The term is related to the escaping tendency of a substance from any particular phase. For an ideal vapor or gas, this escaping tendency is equal to the partial pressure so that it varies greatly with changes in the total pressure. For a liquid, change in escaping tendency as a function of total pressure is small. The escaping tendency of a liquid always depends upon the temperature and concentration. In the present invention, the feed substance is typically a liquid solution and the other side of the membrane maintained such that a liquid phase exists. A vapor feed may be employed when the mixture to be separated is available in that form from an industrial process or when heat economies are to be effected in multi-stage process.

In a preferred embodiment of this inventive process, the first or feed surface of the membrane is contacted with an aqueous mixture in the liquid phase, while the second side or surface of the membrane is contacted with a water-miscible sweep liquid which has a thermally dependent water miscibility. However, the aqueous mixture feed can be in the vapor phase wherein it is preferable that the feed side of the membrane be under a suitable pressure. In order for permeation of the water to occur, there must be a chemical potential gradient for the water between the two zones, i.e. the feed side of the membrane as compared to the sweep liquid or permeate side of the membrane. The chemical potential gradient for purposes of this invention requires that the chemical potential in the feed zone be higher than the chemical potential in the permeate zone. Under such conditions a portion of the aqueous feed mixture will dissolve within the membrane and permeate therethrough, that portion being water since an essential feature of the invention is that the membrane be selectively permeable to water.

The permeation step is conducted by contacting the aqueous feed mixture in either the liquid or vapor phase with the membrane and recovering a water permeate fraction from the other side of the membrane in the form of a water-enriched, water miscible liquid. To facilitate rapid permeation of the water, the chemical potential of the permeated water at the surface of the membrane on the permeate side could be kept at a relatively low level through the rapid removal of the permeate fraction, for example through a continuous process wherein the water enriched, miscible liquid continually removed and replaced by a miscible sweep liquid stream. A preferred method of operating consists of contacting the aqueous mixture as a liquid with the membrane and removing the water permeate through single phase miscibility of the water and the sweep liquid.

The aqueous feed mixture may be continuously be intermittingly introduced into the membrane feed zone. The permeated water is removed from the opposite side of the membrane and the permeation zone in a batch or continuous manner through the use of a water-miscible sweep liquid in the form of a water enriched, miscible liquid phase. The permeant fraction of the aqueous mixture may be continuously or intermitently removed. The rate of introduction of the aqueous feed mixture and the removal of the permeant fraction may be adjusted to provide the desired proportions of permeate and permeant fraction. A number of permeation stages may be employed and the permeate and permeant fractions may be recycled to various stages. In each permeation zone the membrane may be used in the form of sheets, tubes, hollow fibers, or other structures which preferentially provide a maximum amount of membrane surface while utilizing a minimum volume of space.

The absolute pressure on the feed and the permeate zones may vary considerably. Pressure differentials of from 10 mm of mercury to as high as 500 to 1000 psig or higher may be used depending upon the strength of the membrane and the separation requirement i.e. a vapor feed system versus a liquid feed system. It is usually preferred to operate a permeate zone at ambient pressures since the recovery system along the permeate side of the membrane involves a sweep liquid having a thermally dependent water miscibility. However, when gas or vapor feed mixtures are utilized, other pressures on the feed zone can result in modified chemical potential and is desirable.

The membrane permeation step is preferably operated under ambient conditions of temperature which can vary over a wide range from about $-50°$ C. to about $250°$ C. depending upon the selection of the water-miscible sweep liquid and the thermal condition of the aqueous feed mixture. Higher operating temperatures are frequently desirable because of the increased rates of permeation, however, the present invention is primarily concerned with minimum energy input or minimum temperature change for the purpose of separating water from aqueous mixtures. The water enriched miscible liquid phase separation step involves the heating or cooling of the withdrawn phase depending on the permeate zone temperature and selected sweep liquid, to form two phases, a water rich phase and a sweep liquid phase. The permeate zone phase separation of water is accomplished without a change from the liquid phase such as vaporization or crystallization. Depending on the permeate zone conditions and the selected sweep liquid, the single phase separation of water can result from a minimum temperature change of about $0.5°$ C. or greater.

The permeation membrane used in the inventive process is non-porous, that is, free from holes and tears and the like, which destroy the continuity of the membrane surface. Useful membranes according to the invention are comprised of organic, polymeric materials. The membranes are preferably in as thin a form as possible which permits sufficient strength and stability for use in the permeation process. Generally separation membranes from about 0.1 to about 15 mils or somewhat more are utilized. High rates of permeation are obtained with thinner membranes which can be supported with structures such as fine mesh wire, screen, porous metals, and ceramic materials. The membrane may be a simple disc or sheet of the membrane substance which is suitably mounted in a duct or pipe, or mounted in a plate and framed filter press. Other forms of membrane may also be employed such as hollow tubes and fibers through which or around which the feed is applied or is recirculated with the permeate being removed at the other side of the tube as a water-enriched sweep liquid phase. Various other useful shapes and sizes are readily adaptable to commercial installations. The membrane polymeric components may be linear or crosslinked and vary over a wide range of molecular weight. The membrane, of course, must be insoluble in the aqueous feed mixture or the sweep liquid medium. Membrane insolubility as used herein is taken to include that the membrane material is not substantially soluble or sufficiently weakened by its presence in the sweep liquid or aqueous mixture to impart characteristics which can cause creep and rupture under the conditions of construction and use, including high pressure. The organic membranes may be polymers which have been polymerized or treated so that various end groups are present in the polymeric material. The membranes according to the inventive process may be prepared by any suitable feature such as, for example, the casting of film or spinning of a hollow fiber from a "dope" containing organic polymer and solvent. Such preparations are well known in the art. An important control of the separation capacity of a particular organic membrane is exercised by the method used to form and solidify the membrane e.g. casting from a melt into controlled atmospheres or from solution at various concentrations and temperatures. The art of membrane use is well known with substantial literature being available on membrane support, fluid flow and the like. The present invention is practiced with such conventional apparatus. The membrane must, of course, be sufficiently thin to permit permeation as desired but sufficiently thick so as not to rupture under operating conditions. The membrane according to the invention must be selectively permeable to water in comparison to the other components.

The water-miscible sweep liquid utilized according to the invention having a thermally dependent miscibility for water may be selected from those liquids having an inverted miscibility or a normal miscibility for water. Suitable sweep liquids having an inverted water solubility curve may be selected from: diisopropyl amine, 2-methylpropyl-ethyl amine, isopropyl ethyl amine, 1-methylpropyl-dimethyl amine, isopropyl ethyl methyl amine, diethyl methyl amine, 2-butanone, 2,3-dimethylpyridine, ethylene glycol, n-butyl ether, hexamethyleneimine, 3-methylpyridine, triethyl amine, and the like. Suitable sweep liquids having normal water miscibility curves are phenol, acetylacetone, adiponitrile, aniline phenolate, 2,3-dinitrophenol, isovaleric acid, nitromethane, 3-pentanone, propionitrile, phenylacetic acid, and the like. Two suitable, but by no means the optimum sweep liquids were utilized to demonstrate the invention and include phenol having a normal water miscibility curve and triethyl amine having an inverted water solubility curve.

A number of organic membrane films were demonstrated as having the necessary stability as to a selected sweep liquid. The following membranes maintained satisfactory strengths after being immersed 24 hours in a bath of 70% by weight phenol and 30% by weight water at 75° C.: polyvinyl chloride, polyacrylonitrile copoly (tetrafluoroethylene/vinyl sulfonic acid), fluorinated copoly (ethylene/propylene), and copoly (ethylene/tetrafluoroethylene) -55/45 molar ratio. The following membranes were immersed for 24 hours in a bath of 97% by weight triethylamine and 3% by weight water at 24° C.: polyvinyl chloride, polyaromatic sulfone, polymethylene oxide, polyester, cellulose, nylon 66, polyacrylonitrile, copoly (acrylonitrle/2,5-methyl-vinylpyridine-93/7, w/w), copoly (ethylene/tetrafluoroethylene-55/45 molar ratio) and copoly (tetrafluoroethylene/vinyl sulfonic acid).

The following examples illustrate specific embodiments of the present invention which are within the broader teachings of the inventive process. The membranes as employed in the examples were in the form of a film disc, mounted in a membrane holder. All membranes employed in the examples were prepared by casting from polymer solution.

EXAMPLE 1

Water was separated from an aqueous mixture comprised of 3.8% by weight ethanol and 96.2% by weight water by contacting the aqueous mixture with a first surface of a syndiotactic polyvinyl chloride. The permeation was carried out at 63° C. with the sweep liquid initially being comprised of 72.5% by weight phenol and 27.5% by weight water, the sweep liquid having a cloud point of 22° C. After 94 hours of membrane contact the cloud point temperature of the sweep liquid was 24.5° C. which characterized the sweep liquid water concentration as 28% by weight. Two liquid phases were formed at 22° C., one 92% water by weight and the other 27.5% water by weight.

EXAMPLE 2

An aqueous mixture comprised of 1.5% by weight ethanol, 1.8% by weight butanol, and 96.7% by weight water was utilized as the aqueous mixture feed for the process as in Example 1. After 94 hours, the sweep liquid cloud point was 26.7° C., indicating the water-entriched sweep liquid phase as having 28.4% by weight water content. Phase separation occurred at 22° C. as explained in Example 1.

EXAMPLE 3

The separation procedure of Example 1 was utilized for separating water from an aqueous mixture feed comprised of 4.0% by weight sodium chloride and 96.0% by weight water. After 96 hours, the sweep liquid cloud point was 24.6° C. indicating the water enriched sweep liquid phase as having 28.0% by weight water content. Phase separation occurred as in Example 1.

EXAMPLE 4

Water was separated from an aqueous mixture feed comprised of 3.7% by weight ethanol, 3.0% by weight butanol, and 93.3% by weight water by contacting the aqueous mixture with a first surface of the polyacrylonitrile membrane. The permeation was carried out at 23° C. with the sweep liquid in contact with the second membrane surface initially being comprised of 96.1% by weight triethylamine and 3.9% by weight water and having a cloud point of 60° C. After 72 hours, the water enriched sweep liquid phase contained 94.6% by weight triethylamine and 5.4% by weight water and formed two liquid phases at 63° C., one with 3.9% water and the other with over 97% water.

EXAMPLE 5

An aqueous mixture comprised of 91.8% by weight water and an 8.2% by weight ethanol was utilized as the aqueous mixture feed for the process according to Example 4. After 72 hours, the water enriched sweep liquid phase contained 94.5% by weight triethylamine and 5.5% by weight water and resulted in two liquid phases at 63° C. with compositions as described in Example 4.

The membranes of Examples 6 and 7 were selected by conducting pervaporization processes wherein the liquid feed was 97.5% by weight triethylamine, and 2.5% by weight water at a temperature of 24° C. Four membranes were tested using pervaporization methods and the above feed with the results as compiled in Table 1 below.

Table 1

| Membrane | Thickness (mils) | Rate gm/hr - 11 cm | SF[a] |
|---|---|---|---|
| Nylon 66 | 1 | 0.0011 | 18,000 |
| copoly(ethylene/tetra-fluroethylene-55/45 molar ratio) | 1 | 0.00086 | 250,000 |
| Mixture of acrylonitrile copolymers Acrilan 1656 | 1 | 0.0048 | 14,000 |
| poly(formaldehyde)-Celcon XF-300 | 1.5 | 0.0044 | 24,000 |

(a) $SF = C_w/C_{TEA\ permeate} / SF = C_w/C_{TEA\ permeant}$

EXAMPLE 6

A tap water feed was contacted with a first surface of a membrane of poly formaldehyde-Celcon XF-300 which had a thickness of 1.5 mils. The second side of the membrane was contacted with triethylamine containing 2.7% by weight water and having a water saturation temperature of 60° C. After 115 hours, the results indicated that the water permeation rate into the triethylamine was 0.0029 grams per hour through an 11 cm$^2$ membrane area. The final concentration of water in the triethylamine was 4.37% by weight so that two liquid phases could be formed as in Example 4.

EXAMPLE 7

The process of Example 6 was repeated with a membrane comprised of a mixture of acrylonitrile copolymers (Acrilan 1656) having a thickness of 1.0 mils. The resulting water permeation rate was 0.0052 grams per hour for an 11 cm$^2$ section. The final concentration of water in the triethylamine was 5.52% by weight. In both examples 6 and 7 there was an essentially zero rate of triethylamine permeation into the tap water feed side of the membrane separation system.

The results as illustrated by the preceding examples provide a brief but effective view of the nature of the inventive process. The invention provides a new method for membrane separation of aqueous mixtures which is simple, inexpensive, and requires a minimum energy input whether heating or cooling, for successful separation of a variety of aqueous mixtures. Vaporization and crystallization are minimized or eliminated. Aqueous mixtures produced in industry today can often be separated by known techniques, however, the many complex emulsions, dispersions and solutions formed in the ever increasing technological world present separation difficulties which require utilization of a minimum energy, membrane separation system. It should be appreciated however that the invention has been described to have reference to particular embodiments thereof and that modifications and variations are possible without departing from the invention.

What is claimed is:

1. A process for the liquid to liquid, one phase separation of water from aqueous mixtures, comprising: (a) contacting an aqueous mixture with the first surface of an organic polymeric membrane selectively permeable to water; (b) permeating a portion of the water from the aqueous mixture into and through the membrane; (c) contacting a second and opposite surface of the membrane with a water-miscible sweep liquid comprised of phenol; (d) withdrawing a water-enriched, miscible phase from the second membrane surface; (e) thermally adjusting the water-enriched miscible phase to a temperature beyond the water miscibility temperature of the phenol; and (f) forming two liquid phases comprised of the water rich phase and the phenol rich phase.

* * * * *